United States Patent
Hay et al.

(10) Patent No.: US 9,519,788 B2
(45) Date of Patent: Dec. 13, 2016

(54) IDENTIFYING SECURITY VULNERABILITIES RELATED TO INTER-PROCESS COMMUNICATIONS

(71) Applicant: International Business Machines Corporation, Armonk, NY (US)

(72) Inventors: Roee Hay, Herzliya (IL); Omri Weisman, Herzliya (IL)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 13/860,336

(22) Filed: Apr. 10, 2013

(65) Prior Publication Data

US 2014/0310812 A1    Oct. 16, 2014

(51) Int. Cl.
*G06F 21/57* (2013.01)

(52) U.S. Cl.
CPC ....... *G06F 21/577* (2013.01); *G06F 2221/034* (2013.01)

(58) Field of Classification Search
CPC . G06F 21/577; G06F 21/57; G06F 2221/0347
USPC ..... 713/153–154, 187–188, 193–194; 726/1, 726/13, 22–33; 709/206, 249, 389
See application file for complete search history.

(56) References Cited

U.S. PATENT DOCUMENTS

| | | | |
|---|---|---|---|
| 7,895,650 B1 * | 2/2011 | Sobel | G06F 21/554 713/164 |
| 2007/0130621 A1 * | 6/2007 | Marinescu | G06F 21/52 726/22 |
| 2011/0119765 A1 | 5/2011 | Hering et al. | |
| 2011/0179484 A1 | 7/2011 | Tuvell et al. | |
| 2011/0191854 A1 | 8/2011 | Giakouminakis et al. | |
| 2012/0060222 A1 | 3/2012 | Mahaffey et al. | |
| 2012/0110174 A1 | 5/2012 | Wootton et al. | |

(Continued)

OTHER PUBLICATIONS

Chin et al., "Analyzing Inter-Application Communication in Android", MobiSys '11 Proceedings of the 9th international conference on Mobile systems, applications, and services, pp. 239-252, 2011.

(Continued)

*Primary Examiner* — Evans Desrosiers
(74) *Attorney, Agent, or Firm* — Cuenot, Forsythe & Kim, LLC (57) ABSTRACT

Identifying security vulnerabilities related to inter-process communications by identifying within the instructions of a computer software application an object creation location configured to create an inter-process communications object, identifying within the instructions of the computer software application a location of an inter-process communications method, determining whether a path exists for an inter-process communications object created at the object creation location to propagate to the inter-process communications method, classifying with a classification selected from a plurality of predefined classifications, any of the inter-process communications object, the object creation location, and the location of the inter-process communications method, and reporting as a security vulnerability the classified inter-process communications object, object creation location, or location of the inter-process communications method if the path exists and if the classification is predefined to indicate that reporting is warranted.

12 Claims, 4 Drawing Sheets

(56) References Cited

U.S. PATENT DOCUMENTS

2013/0179991 A1* 7/2013 White .................... G06F 21/53
726/29
2014/0310814 A1 10/2014 Hay et al.

OTHER PUBLICATIONS

Batyuk et al. "Using Static analysis for Automatic Assessment and Mitigation of Unwanted and Malicious Activities Within Android Applications", 6th International Conference on Malicious and Unwanted Software (MALWARE), pp. 66-72, 2011.
Johnson et al, "Analysis of Android Applications' Permissions", IEEE 6th International Conference on Software Security and Reliability Companion (SERE-C), pp. 45-46, 2012.
Maji et al., "An Empirical Study of the robustness of Inter-component Communication in Android", 42nd Annual IEEE/IFIP Internationl Conference on Dependable Systems and Networks (DSN), pp. 1-12, 2012.
Shabtai et al., "Automated Static Code analysis for Classifying Android applications Using Machine Learning", International Conference on Computational Intelligence and Security (CIS), pp. 329-333, 2010.
Schmidt et al., "Static Analysis of Executables for Collaborative Malware Detection on Android", IEEE International Conference on Communications, pp. 1-5, 2009.

* cited by examiner

Fig. 4

IDENTIFYING SECURITY VULNERABILITIES RELATED TO INTER-PROCESS COMMUNICATIONS

FIELD OF THE INVENTION

The invention relates to computer software analysis and testing in general.

BACKGROUND OF THE INVENTION

Inter-process communication channels provided by computer operating systems such as Apple iOS™ and Google Android™ have been shown to expose computer users to security risks such as phishing, data interception, and data injection/manipulation. Specifically, the Intent-based mechanism of Android™ for moving data between processes, including applications or components within applications, has been shown to expose users to risks due to improper authentication of incoming Intents or unsafe Intents that transmit sensitive information.

SUMMARY OF THE INVENTION

In one aspect of the invention a method is provided for identifying security vulnerabilities related to inter-process communications, the method including identifying within the instructions of a computer software application an object creation location configured to create an inter-process communications object, identifying within the instructions of the computer software application a location of an inter-process communications method, determining whether a path exists for an inter-process communications object created at the object creation location to propagate to the inter-process communications method, classifying with a classification selected from a plurality of predefined classifications, any of the inter-process communications object, the object creation location, and the location of the inter-process communications method, and reporting as a security vulnerability the classified inter-process communications object, object creation location, or location of the inter-process communications method if the path exists and if the classification is predefined to indicate that reporting is warranted.

Systems and computer program products embodying the invention are also provided.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
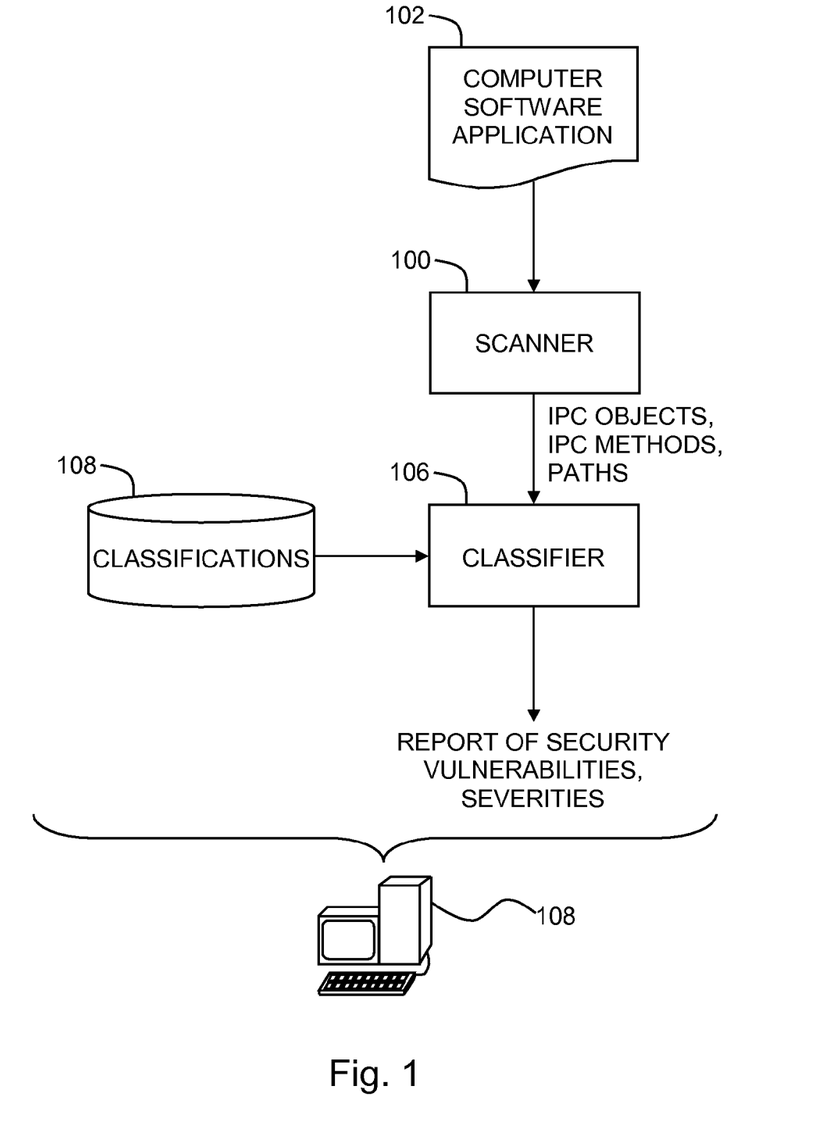
FIG. 1 is a simplified conceptual illustration of a system for a system for identifying security vulnerabilities related to inter-process communications in computer software applications, constructed and operative in accordance with an embodiment of the invention.

Reference is now made to FIG. 1 which is a simplified conceptual illustration of a system for identifying security vulnerabilities related to inter-process communications in computer software applications, constructed and operative in accordance with an embodiment of the invention. In the system of FIG. 1 a scanner 100 is configured to scan the instructions of a computer software application 102, such as in the form of source code or object code, and identify within the instructions, in accordance with conventional techniques such as static analysis and string analysis, locations that are configured to create inter-process communications objects. The term "process" as used herein may refer to computer software application 102, components within computer software application 102, and components of an operating system under which computer software application 102 may be executed. Scanner 100 is configured to identify locations, now referred to as object creation locations, that create inter-process communications objects, as well as determine whether or not a given inter-process communications object is configured to specify target information indicating the target of the inter-process communications object. Where target information is specified, scanner 100 is preferably configured to determine whether or not the target information is "tainted". Tainted target information may, for example, include target information originating from a source that is external to computer software application 102, or otherwise originating from a source that is considered to be an untrusted source, such as where the source target information is write-accessible to one or more computer software applications other than computer software application 102. Where target information is not specified, scanner 100 is preferably configured to determine whether a given inter-process communications object is configured to include references to directives that are commonly known with respect to a given computer operating system. Such commonly known directives may, for example, include a specific Intent category or specific Intent action that is predefined as such for use with the Android™ operating system, commercially available from Google Corporation, Mountain View, Calif.

Scanner 100 is also preferably configured to identify within the instructions of computer software application 102 locations of inter-process communications methods, as well as determine whether a path exists for an inter-process communications object created at an identified object creation location to propagate to an identified inter-process communications method.

The system of FIG. 1 also preferably includes a classifier 104 configured to differently classify, based on a set of predefined classifications 106, any of the locations and/or the inter-process communications objects based on whether a given inter-process communications object is configured to specify target information and, if so, whether the target information is tainted, and where target information is not specified, whether a given inter-process communications object is configured to include references to directives that are commonly known with respect to a given computer operating system. Classifier 104 is also preferably configured to report a given inter-process communications object, its object creation location, and/or the location of an inter-process communications method, as a security vulnerability where a path exists for the inter-process communications object to propagate to the identified inter-process communications method, and preferably where the related classification is predefined to indicate that such reporting is warranted. Thus, for example, one classification may be predefined to indicate that locations and/or inter-process communications objects so classified be reported as security vulnerabilities of a potentially high severity, another classification may be predefined to indicate that locations and/or inter-process communications objects so classified be reported as security vulnerabilities of a potentially lower severity, while yet another classification may be predefined to indicate that locations and/or inter-process communications objects so classified need not be reported as security vulnerabilities at all. Classifier 104 is preferably configured to report the security vulnerabilities in accordance with conventional reporting techniques, such as to a software developer or tester of computer software application 102.

Any of the elements shown in FIG. 1 are preferably implemented by one or more computers, such as a computer 108, in computer hardware and/or in computer software embodied in a non-transitory, computer-readable medium in accordance with conventional techniques.

Figure 2:
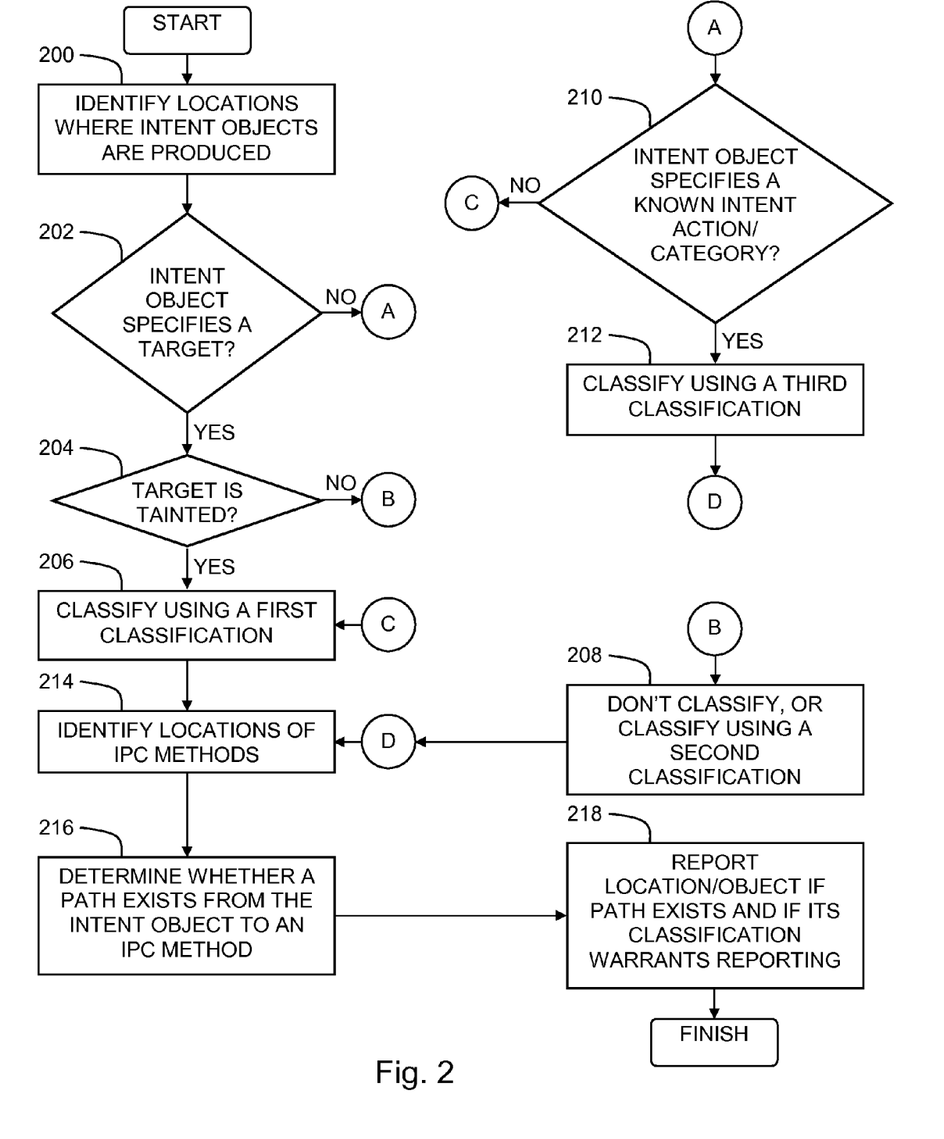
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. The method of FIG. 2 is specifically adapted to identify security vulnerabilities where computer software application 102 is designed for execution on computing devices configured with the Android™ operating system. In the method of FIG. 2, scanner 100 scans the instructions of computer software application 102 to identify any locations within the instructions where inter-process communications objects known as Intent objects are produced (step 200).

For each object creation location, scanner 100 determines whether or not the instructions at that location are configured to produce an Intent object that specifies a target (step 202), where such an object is commonly referred to as an "explicit" Intent object. If the instructions are configured to produce an explicit Intent object, scanner 100 determines whether the target information is tainted (step 204), such as where the object creation location gets the name of the target from a data file that is write-accessible to computer software applications other than computer software application 102. If the target information is tainted, classifier 104 classifies the object creation location and/or the explicit Intent object using a first classification (step 206), whereas if the target information is not tainted, classifier 104 either does not classify the object creation location and/or the explicit Intent object at all, or classifies the object creation location and/or the explicit Intent object using a second classification (step 208).

For each object creation location where scanner 100 determines that the instructions at a given object creation location are configured to produce an Intent object that does not specify a target, scanner 100 determines whether the Intent object is configured to specify an Intent category and/or an Intent action that is/are not an Intent category or Intent action that is predefined as such for use with the Android™ operating system (step 210), where, for example, such predefined Intent actions include values such as ACTION_VIEW and ACTION_DIAL and such predefined Intent categories include values such as CATEGORY_BROWSABLE and CATEGORY_LAUNCHER. If the instructions are configured to produce an Intent object that specifies an Intent category and/or an Intent action that is/are not predefined for use with the Android™ operating system, classifier 104 classifies the object creation location and/or the Intent object using the first classification (step 206). If the instructions are configured to produce an Intent object that specifies an Intent category that is predefined for use with the Android™ operating system, or that specifies both an Intent action and an Intent category that are predefined for use with the Android™ operating system, classifier 104 classifies the object creation location and/or the Intent object using a third classification (step 212).

Scanner 100 identifies within the instructions of computer software application 102 locations of inter-process communications methods (step 214), as well as determines whether a path exists for an Intent object created at an identified object creation location to propagate to an identified inter-process communications method (step 216). Classifier 104 reports a given Intent object, its object creation location, and/or the location of an inter-process communications method, as a security vulnerability where a path exists for the Intent object to propagate to the identified inter-process communications method, and preferably where the related classification is predefined to indicate that such reporting is warranted (step 218). Thus, for example, the first classification may indicate that a security vulnerability of a high severity be reported, the third classification may indicate that a security vulnerability of a lower severity be reported, and the second classification may indicate that no reporting be made.

Figure 3:
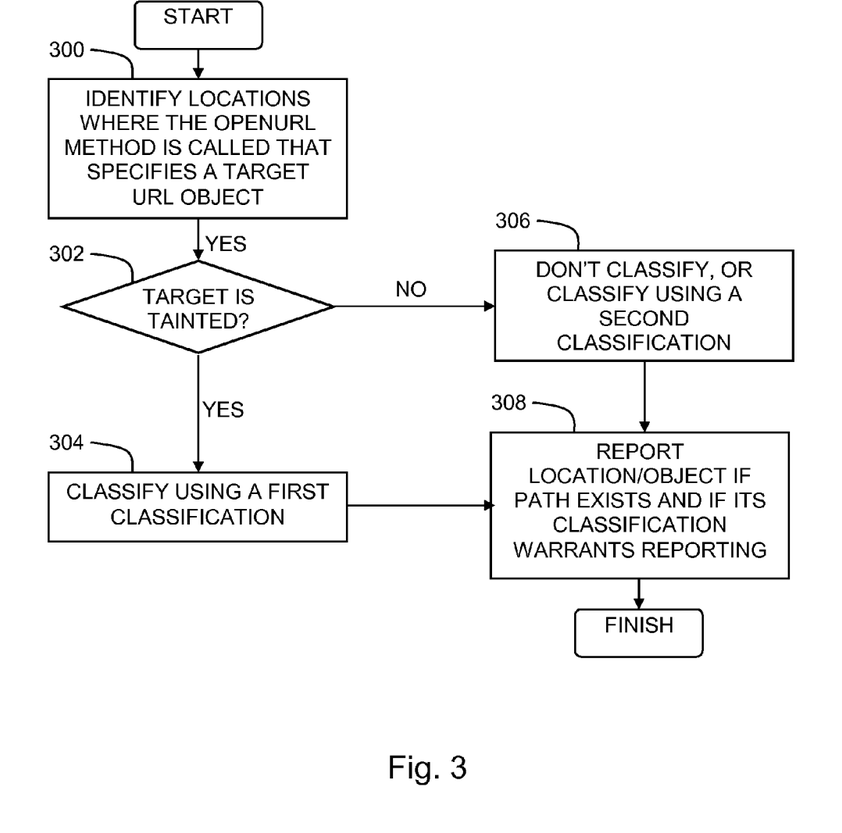
FIG. 3 is a simplified flowchart illustration of an exemplary method of operation of the system of FIG. 1, operative in accordance with an embodiment of the invention.

Reference is now made to FIG. 3, which is a simplified flowchart illustration of an exemplary method of operation of the system of FIG. 1, operative in accordance with an embodiment of the invention. The method of FIG. 3 is specifically adapted to identify security vulnerabilities where computer software application 102 is designed for execution on computing devices configured with the iOS™ operating system, commercially available from Apple Incorporated, Cupertino, Calif. In the method of FIG. 3, scanner 100 scans the instructions of computer software application 102 to identify any locations within the instructions where the openURL method is called that specifies a target URL object (step 300). Scanner 100 also determines whether the target information is tainted (step 302), such as where the target URL object comes from a network connection that is designated as untrusted. If the target information is tainted, classifier 104 classifies the location and/or the URL object using a first classification (step 304), whereas if the target information is not tainted, classifier 104 either does not classify the location and/or the URL object at all, or classifies the location and/or the URL object using a second classification (step 306). Classifier 104 report a given inter-process communications object, its object creation location, and/or the location of an inter-process communications method, as a security vulnerability where a path exists for the inter-process communications object to propagate to the identified inter-process communications method, and preferably where the related classification is predefined to indicate that such reporting is warranted (step 308). Thus, for example, the first classification may indicate that a security vulnerability of a high severity be reported, and the second classification may indicate that no reporting be made.

Figure 4:
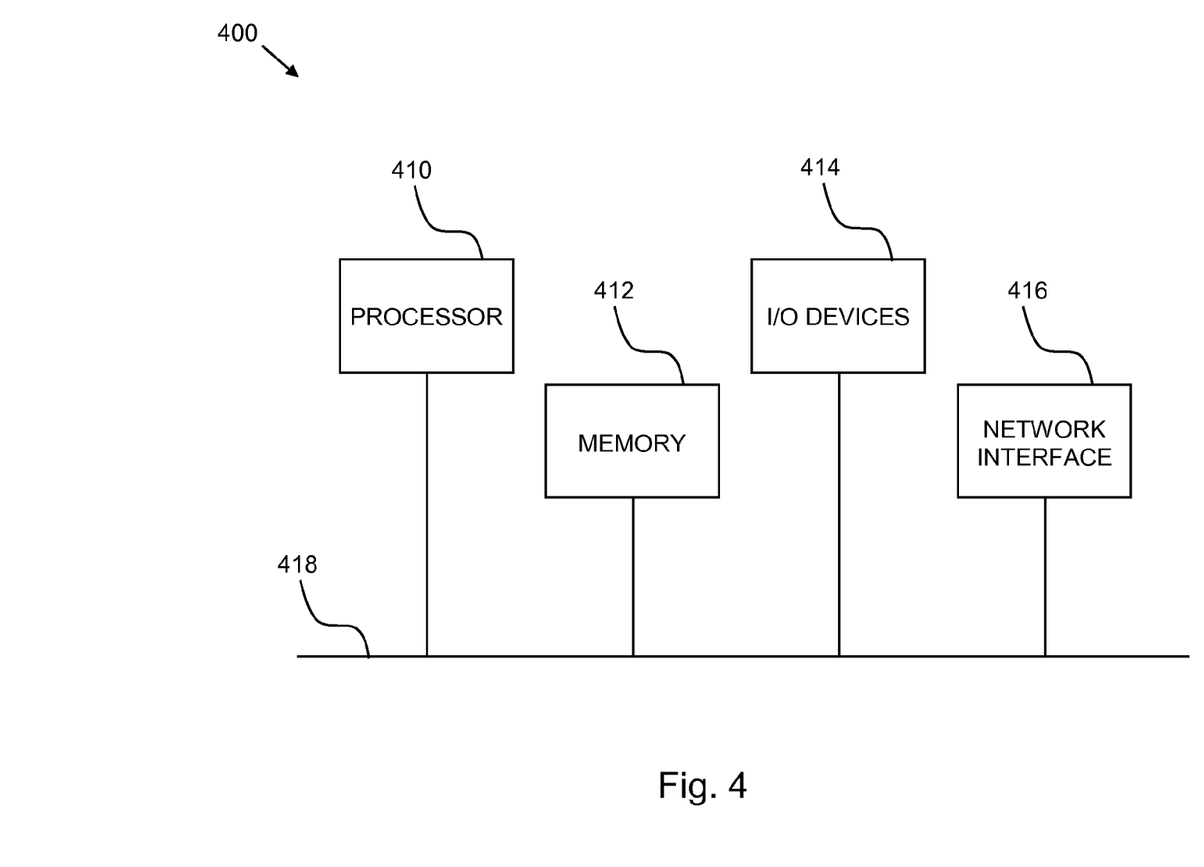
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for identifying security vulnerabilities related to inter-process communications, the system comprising:
    a hardware processor including:
        a scanner configured to:
            identify within the instructions of a computer software application an object creation location configured to create an inter-process communications object,
            identify within the instructions of the computer software application a location of an inter-process communications method,
            determine whether a path exists for an inter-process communications object created at the object creation location to propagate to the inter-process communications method; and
        a classifier configured to
            classify with a classification selected from a plurality of predefined classifications, any of the inter-process communications object, the object creation location, and the location of an inter-process communications method, and
            report as a security vulnerability the classified inter-process communications object, object creation location, or location of the inter-process communications method if the path exists and if the classification is predefined to indicate that reporting is warranted, wherein the scanner is configured to perform static analysis of the instructions of the computer software application to identify the inter-process communications object, the object creation location, and the location of the inter-process communications method, and determine whether the path exists, and the classifier is configured to report a severity of the security vulnerability that is indicated by the classification, wherein the predefined classifications indicate different severities.

2. The system of claim 1 wherein the classifier is configured to classify using one classification if the inter-process communications object is configured to specify target information that is tainted, and using a different classification if the inter-process communications object is configured to specify target information that is not tainted.

3. The system of claim 2 wherein the scanner is configured to determine that the target information is tainted if it originates from an untrusted source.

4. The system of claim 2 wherein the scanner is configured to determine that the target information is tainted if it is write-accessible to at least one other computer software application.

5. The system of claim 1 wherein the classifier is configured to classify using one classification if the inter-process communications object is not configured to specify target information and is configured to include references to directives that are commonly known with respect to a given computer operating system, and using a different classification if the inter-process communications object is not configured to specify target information and is not configured to include references to directives that are commonly known with respect to the given computer operating system.

6. The system of claim 5 wherein the scanner is configured to determine that the references to directives include any of a) a Google Android™ intent action having a value that is not a predefined Google Android™ intent action value, and b) an Google Android™ intent category having a value that is not a predefined Google Android™ intent category value.

7. The system of claim 1 wherein the scanner and classifier are embodied in any of a) computer hardware, and b) computer software embodied in a non-transitory, computer-readable medium.

8. A computer program product for identifying security vulnerabilities related to inter-process communications, the computer program product comprising:
    a storage hardware device; and
    computer-readable program code embodied in the storage hardware device, wherein the computer-readable program code is configured to:
        identify within the instructions of a computer software application an object creation location configured to create an inter-process communications object,
        identify within the instructions of the computer software application a location of an inter-process communications method,
        determine whether a path exists for an inter-process communications object created at the object creation location to propagate to the inter-process communications method,
        classify with a classification selected from a plurality of predefined classifications, any of the inter-process communications object, the object creation location, and the location of an inter-process communications method, report as a security vulnerability the classified inter-process communications object, object creation location, or location of the inter-process communications method if the path exists and if the classification is predefined to indicate that reporting is warranted, perform static analysis of the instructions of the computer software application to identify the inter-process communications object, the object creation location, and the location of the inter-process communications method, and determine whether the path exists, and report a severity of the security vulnerability that is indicated by the classification, wherein the predefined classifications indicate different severities.

9. The computer program product of claim 8 wherein the computer-readable program code is configured to classify using one classification if the inter-process communications object is configured to specify target information that is tainted, and using a different classification if the inter-process communications object is configured to specify target information that is not tainted.

10. The computer program product of claim 9 wherein the computer-readable program code is configured to determine that the target information is tainted if it originates from an untrusted source.

11. The computer program product of claim 9 wherein the computer-readable program code is configured to determine that the target information is tainted if it is write-accessible to at least one other computer software application.

12. The computer program product of claim 8 wherein the computer-readable program code is configured to classify using one classification if the inter-process communications object is not configured to specify target information and is configured to include references to directives that are commonly known with respect to a given computer operating computer program product, and using a different classification if the inter-process communications object is not configured to specify target information and is not configured to include references to directives that are commonly known with respect to the given computer operating computer program product.

* * * * *